United States Patent [19]
Park

[11] Patent Number: 6,091,213
[45] Date of Patent: Jul. 18, 2000

[54] HORIZONTAL DEFLECTION CIRCUIT FOR A MONITOR

[75] Inventor: Tae-Gil Park, Kyunggi-Do, Rep. of Korea

[73] Assignee: Daewoo Electronics Co., Ltd., Seoul, Rep. of Korea

[21] Appl. No.: 09/079,197

[22] Filed: May 15, 1998

[30] Foreign Application Priority Data

Jun. 26, 1997 [KR] Rep. of Korea ................ 97-27815

[51] Int. Cl.$^7$ .............................. G09G 1/04; H01J 29/56; H01J 29/70
[52] U.S. Cl. ........................ 315/371; 315/370; 315/403
[58] Field of Search .................................. 315/370, 371, 315/403

[56] References Cited

U.S. PATENT DOCUMENTS

| | | | |
|---|---|---|---|
| 5,349,274 | 9/1994 | Watanabe et al. | 315/395 |
| 5,475,286 | 12/1995 | Jackson et al. | 315/371 |
| 5,894,203 | 4/1999 | Lee | 315/387 |

*Primary Examiner*—Seungsook Ham
*Assistant Examiner*—John Patti
*Attorney, Agent, or Firm*—Smith, Gambrell & Russell, LLP

[57] ABSTRACT

A horizontal deflection circuit for a monitor is disclosed. The horizontal deflection circuit for a monitor includes a microprocessor for determining a mode of the monitor according to frequencies of the horizontal sync signal Hs and a vertical sync signal Vs such as VGA(video graphic adapter), and SVGA(super VGA) and for generating a control signal to generate a horizontal picture size signal and a distortion correcting signal of parabolic waveform corresponding to the determined mode; a distortion correcting signal generating unit for superimposing the distortion correcting signal and the horizontal picture size signal and for outputting a superimposed signal; a distortion correcting signal control unit for controlling an amplitude of the superimposed signal in accordance with an amplifying signal; a PWM signal generating unit for pulse-width modulating an output signal of the distortion correcting signal control unit and for outputting a PWM signal; a buffer for buffering the PWM signal; and a distortion correcting signal output unit for amplifying the PWM signal in accordance with an externally-supplied voltage source B+ and for supplying the amplifying signal to the horizontal deflection coil.

3 Claims, 5 Drawing Sheets

HORIZONTAL DEFLECTION CIRCUIT FOR A MONITOR

BACKGROUND OF THE INVENTION

1. Field of the Invention

The present invention relates to a monitor, and more particularly to a horizontal deflection circuit for a monitor capable of stabilizing an amplitude of distortion correcting signal of parabolic waveform supplied to a horizontal deflection coil.

2. Description of the Prior Art

A conventional monitor is an apparatus which displays a video signal in accordance with an externally-supplied synchronization(hereafter, simply referred to as "sync") signal. The above conventional monitor separates a deflecting circuit for generating a horizontal deflection signal of sawtooth waveform and for supplying the horizontal deflection signal to a horizontal deflection coil and a distortion correcting circuit for generating a distortion correcting signal of parabolic waveform and for supplying the distortion correcting signal to the horizontal deflection coil.

However, in order to enhance a quality of a picture, the deflecting circuit and the distortion correcting circuit includes in the conventional horizontal deflection circuit.

Generally, an electron emitted from a cathode of a Cathode Ray Tube(CRT) is accelerated in accordance with a voltage applied to a grid terminal and then is deflected by a magnetic field generated at a deflection coil. The deflected electron collides with a phosphor screen and the point of collision of the phosphor screen is moved.

The deflecting distance is proportional to the intensity of the magnetic field and the intensity of the magnetic field is proportional to the quantity of current of sawtooth waveform which flows in the deflection coil. Therefore, the multi-mode monitor is equipped with a horizontal deflection coil for deflecting the electron in the horizontal direction from left to right constantly and returning it from right to left rapidly and a vertical deflection coil for deflecting it in the vertical direction.

FIG. 1 is a view for showing a horizontal deflection signal of sawtooth waveform supplied to a horizontal deflection coil in a conventional monitor. Here, the electron is deflected to the leftmost end point of the phosphor screen at a point a. Since the current does not flow to the horizontal deflection coil, the electron advances straight to a point b. Further, since the quantity of current gradually increases, the electron is deflected to the rightmost end point of the phosphor screen at a point c. Thereafter, the quantity of current is suddenly reduced and the electron is again deflected to the leftmost end point at a point a1.

FIG. 2 is a view for showing a construction of a conventional horizontal deflection circuit for a monitor. Here, reference numeral 1 denotes a deflection section for generating a horizontal deflection signal of sawtooth waveform in accordance with an externally-supplied horizontal sync signal and for supplying the horizontal deflection signal to a horizontal deflection coil HDY.

Reference numeral 2 denotes a distortion correcting section for superimposing a horizontal picture size signal and a distortion correcting signal corresponding to a mode of the monitor such as a video graphic adapter(VGA), super VGA (SVGA), etc., which determines according to the horizontal sync signal and the vertical sync signal, and for supplying a superimposed signal to the deflection section 1.

The deflection section 1 comprises an oscillator 11 for oscillating and pulse-width modulating the externally-supplied horizontal sync signal in accordance with the frequency thereof and for outputting an oscillating signal, a horizontal driving unit 13 for amplifying the oscillating signal in accordance with a voltage of an externally-supplied voltage source Vcc and for generating a driving signal, and a horizontal output unit 15 for generating a horizontal deflecting signal of sawtooth waveform in accordance with the horizontal driving signal and for supplying the horizontal deflecting signal to the horizontal deflection coil HDY.

In the meantime, the distortion correcting section 2 includes a microprocessor 21 for determining the mode of the monitor according to a frequencies of the horizontal sync signal Hs and a vertical sync signal Vs and for generating a control signal to generate a horizontal picture size signal and a distortion correcting signal of parabolic waveform, a distortion correcting signal generating unit 22 for superimposing the distortion correcting signal and the horizontal picture size signal, a pulse-width modulating(hereafter simply referred to as PWM) signal generating unit 24 for pulse-width modulating the superimposed signal, and for outputting the PWM signal, a buffer 25 for buffering the PWM signal, and a distortion correcting signal output unit 27 for amplifying the PWM signal in accordance with an output signal of the buffer 25 and an externally-supplied voltage source B+ and for outputting an amplifying signal to the horizontal deflection coil HDY.

In the above described construction of the conventional horizontal deflection circuit for a monitor, the horizontal sync signal Hs is supplied to the oscillator 11 of the deflection section 1, and the oscillator 11 converts a horizontal sync signal Hs to the oscillating signal. The oscillating signal is supplied to the horizontal driving unit 13 which amplifies the oscillating signal and generates a driving signal. The driving signal is supplied to the horizontal output unit 15. The horizontal output unit 15 generates the horizontal deflection signal of sawtooth waveform which flows in the horizontal deflection coil HDY in accordance with the amplifying signal supplied from the distortion correcting signal output unit 27 and the externally-supplied voltage source B+, as shown in FIG. 1.

The horizontal sync signal Hs and the vertical sync signal Vs are supplied to the microprocessor 21 of the distortion correcting section 2, and the microprocessor 21 determines the mode of monitor in accordance with the horizontal sync signal Hs and the vertical sync signal Vs and generates the control signal to be inputted to a distortion correcting signal generating unit 22 for generating the horizontal picture size signal and the distortion correcting signal of parabolic waveform.

The distortion correcting signal generating unit 22 superimposes the horizontal picture size signal and the distortion correcting signal, and the superimposed signal is supplied to the PWM signal generating unit 24. The PWM signal generating unit 24 modulates the superimposed signal and outputs the PWM signal, as shown in FIG. 3.

The PWM signal is supplied to the buffer 25 which buffers the PWM signal. The output signal of the buffer 25 is supplied to the distortion correcting signal output unit 27.

The distortion correcting signal output unit 27 amplifies the output signal of the buffer 25 in accordance with the externally-supplied voltage source B+ and supplies the amplifying signal to the horizontal deflection coil HDY.

However, in such conventional horizontal deflection circuit, when the mode is changed, the distortion correcting signal is unstable, and the unstable distortion correcting signal is supplied to the horizontal deflection coil. Therefore, the horizontal deflection circuit is unstable and a switching device of the distortion correcting output unit is damaged by a switching cycle of the PWM signal.

SUMMARY OF THE INVENTION

Therefore, it is an object of the present invention to provide a horizontal deflection circuit for a monitor capable of stabilizing an amplitude of the distortion correcting signal when the mode is changed.

To achieve the above object of the present invention, a horizontal deflection circuit for a monitor having a deflection circuit receives an externally-supplied horizontal sync signal, generates a horizontal deflection signal of sawtooth waveform, and supplies said horizontal deflection signal to a horizontal deflection coil. The horizontal deflection circuit for a monitor includes a microprocessor for determining the mode of the monitor according to frequencies of the horizontal sync signal and a vertical sync signal and for generating a control signal in order that a horizontal picture size signal and a distortion correcting signal of parabolic waveform are generated. A distortion correcting signal generating unit superimposes the distortion correcting signal and the horizontal picture size signal. A PWM signal generating unit 24 pulse-width modulates the superimposed signal and outputs a PWM signal. A buffer buffers the PWM signal. Further, a distortion correcting signal output unit amplifies the PWM signal in accordance with an externally-supplied voltage source and supplies an amplifying signal to the horizontal deflection coil. Additionally, a distortion correcting signal control unit connected between the distortion correcting signal generating unit and the PWM signal generating unit controls an amplitude of distortion correcting signal in accordance with the amplifying signal of the distortion correcting signal output unit.

According to the preferred embodiment of the present invention, the horizontal sync signal and vertical signal are supplied to the microprocessor which determines the mode of monitor and generates the control signal for generating the horizontal picture size signal and the distortion correcting signal of parabolic waveform. The control signal is supplied to the distortion correcting signal generating unit which superimposes the horizontal picture size signal and the distortion correcting signal and outputs the superimposed signal. The superimposed signal is supplied to the PWM signal generating unit which modulates the superimposed signal and outputs the PWM signal. The PWM signal is supplied to the distortion correcting signal output unit through the buffer which amplifies the PWM signal in accordance with the externally-supplied voltage source and supplies the amplifying signal to horizontal deflection coil. The amplifying signal is supplied to the distortion correcting signal control unit which controls the amplitude of the distortion correcting signal in accordance with the amplifying signal. Consequently, the amplitude of the distortion correcting signal is controlled in accordance with the amplifying signal, so the distortion correcting signal can be stable.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A horizontal deflection circuit for a multi-mode monitor according to an embodiment of the present invention will be described in more detail with reference to the accompanying drawings.

Figure 4:
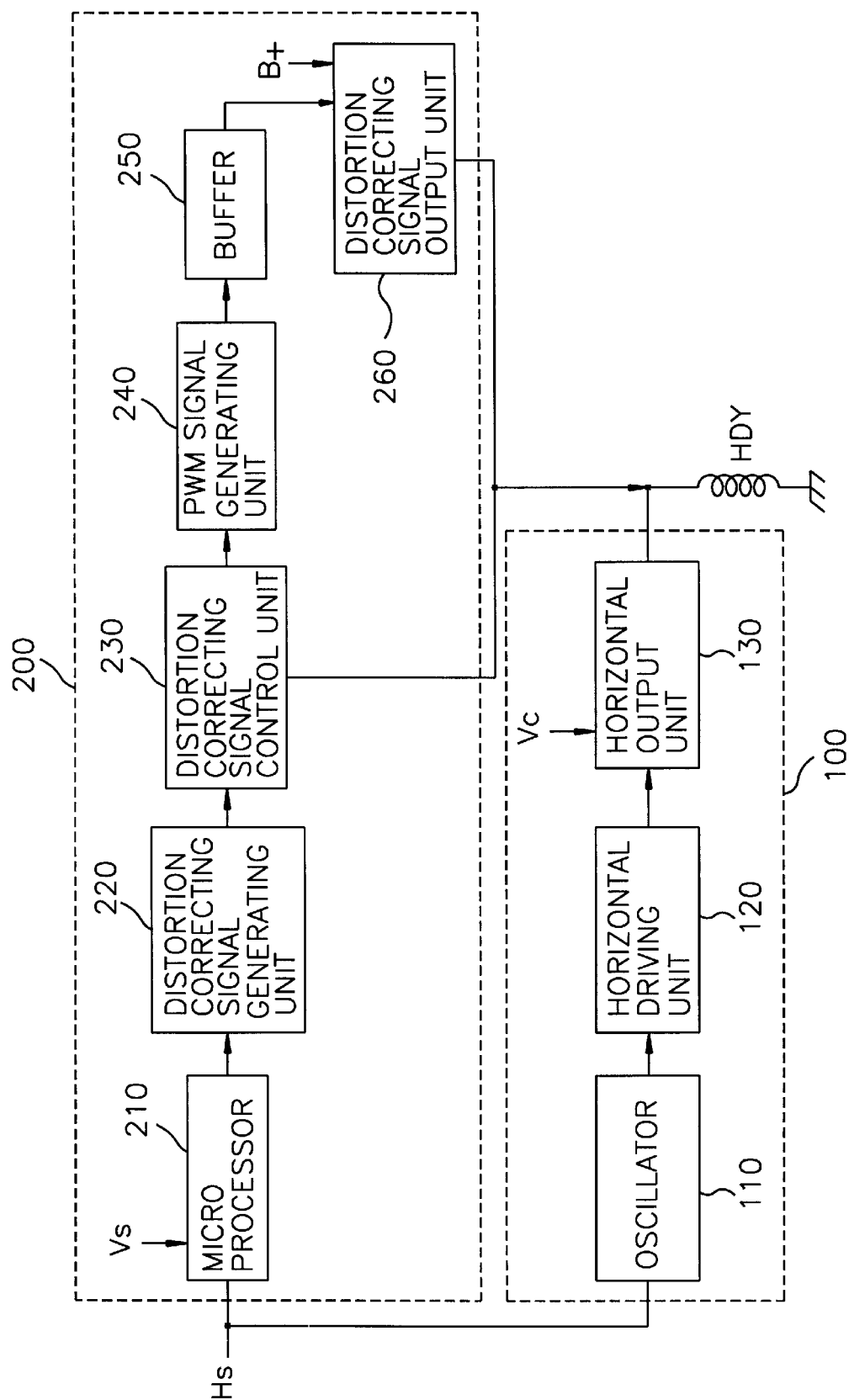
FIG. 4 is a view for showing a construction of a horizontal deflection circuit for a monitor according to an embodiment of the present invention.

FIG. 4 is a view for showing a construction of the horizontal deflection circuit according to an embodiment of the present invention. In FIG. 4, reference numeral 100 denotes a deflection section for generating a horizontal deflection signal of sawtooth waveform in accordance with an externally-supplied horizontal sync signal Hs and for supplying the horizontal deflection signal to a horizontal deflection coil HDY.

Reference numeral 200 denotes a distortion correcting section for superimposing a horizontal picture size signal and a distortion correcting signal corresponding to a mode of the monitor and for supplying the superimposed signal to the deflection section 1.

The deflection section 100 comprises an oscillator 110 for converting an externally-supplied horizontal sync signal Hs to an oscillating signal in accordance with the frequency thereof, a horizontal driving unit 120 for amplifying the oscillating signal in accordance with a voltage of an externally-supplied voltage source Vcc and for generating a driving signal, and a horizontal output unit 130 for generating a horizontal deflecting signal of sawtooth waveform in accordance with the horizontal driving signal and for supplying the horizontal deflecting signal to a horizontal deflection coil HDY.

In the meantime, reference numeral 210 denotes a microprocessor 210 for determining the mode of the monitor according to frequencies of the horizontal sync signal Hs and a vertical sync signal Vs and for generating a control signal to generate a horizontal picture size signal and a distortion correcting signal of parabolic waveform corresponding to the determined mode.

Reference numeral 220 denotes a distortion correcting signal generating unit for superimposing the distortion correcting signal and the horizontal picture size signal and for outputting a superimposed signal. Reference numeral 230 denotes a distortion correcting signal control unit for controlling an amplitude of the superimposed signal in accordance with the amplifying signal.

Reference numeral 240 denotes a PWM signal generating unit for pulse-width modulating the output signal of the distortion correcting signal control unit 230 and for outputting a PWM signal.

Reference numeral 250 denotes a buffer 25 for buffering the PWM signal, and reference numeral 270 denotes a distortion correcting signal output unit for amplifying the PWM signal in accordance with an externally-supplied voltage source B+ and for supplying the amplifying signal to the horizontal deflection coil HDY.

Figure 5:
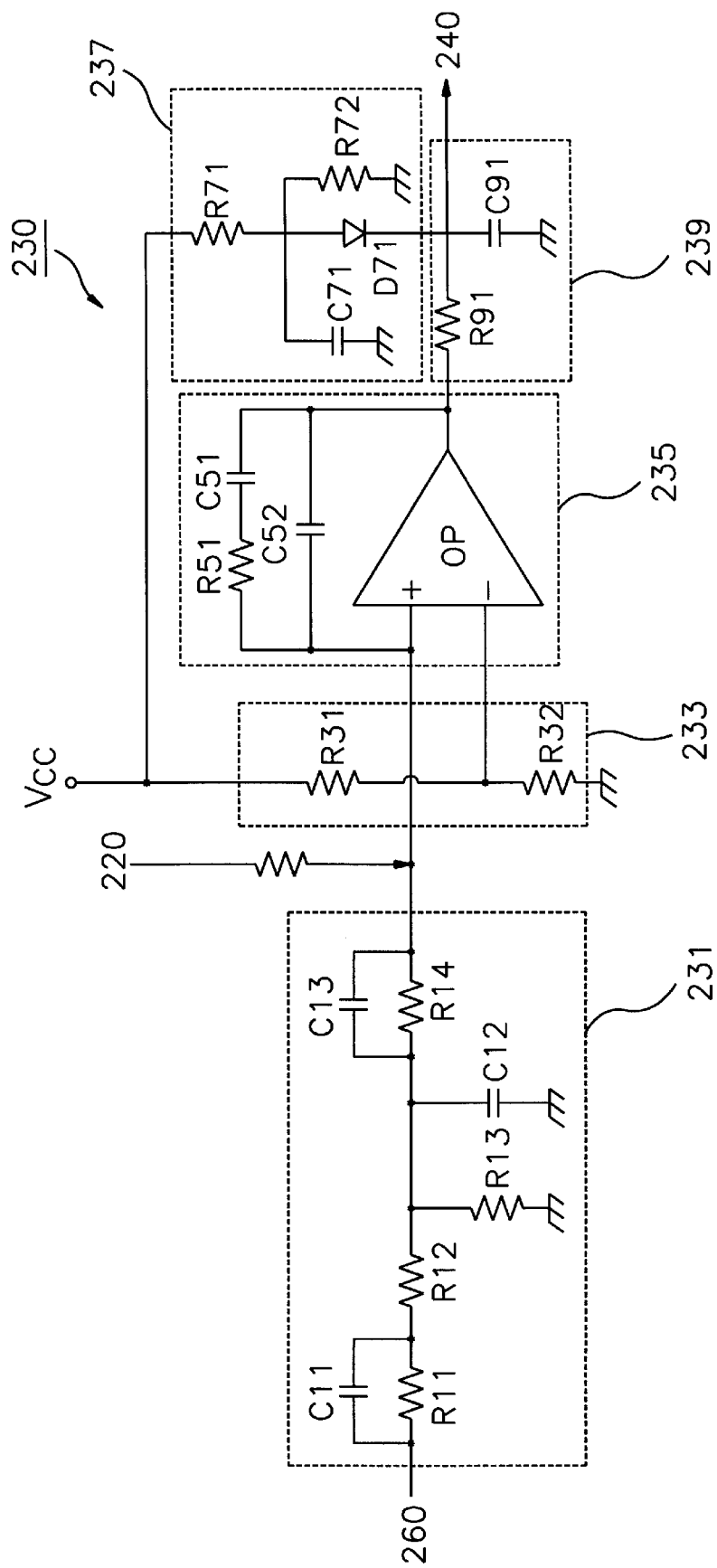
FIG. 5 is a view for showing a construction of the distortion correcting signal control unit in FIG. 4.

FIG. 5 is a view for showing a construction of the distortion correcting signal control unit 230. As shown in FIG. 5, the distortion correcting signal control unit 230 comprises a distortion correcting signal detector 231 for detecting the amplifying signal of the distortion correcting signal output unit 260, a reference voltage generator 233 for setting a reference voltage in accordance with an externally-supplied voltage source Vcc, an amplifier 235 for amplifying the output signal of the distortion correcting signal detector 231 according to the reference voltage, a comparating voltage generator 237 for setting a comparating voltage in accordance with the externally-supplied voltage source Vcc and for superimposing the comparating voltage and an output signal of the amplifier 235 when the generated comparating voltage is higher than a voltage of the output signal of the amplifier 235, and a rectifier 239 for rectifying the comparative voltage and the voltage of the output signal of the amplifier 235.

In other words, the output terminal of the distortion correcting signal output unit 260 is connected to a resistor R11 and a capacitor C11 for detecting the amplifying signal rapidly. The resistor R11 and the capacitor C11 are connected in parallel.

The output terminal of the resistor R11 is connected to resistors R12 and R13 for dividing the detecting signal of the resistor R11 and the capacitor C11, and the one terminal of the resistor R13 is grounded.

And the output terminal of the resistors R12 is connected to a capacitor C12 for rectifying the dividing signal of the resistors R12 and R13, and the one terminal of the capacitor C12 is grounded. The input terminal of the capacitor C12 is connected to a resistor R14 and a capacitor C13 for bypassing the rectifying signal of the capacitor C12 rapidly. The resistor R14 and the capacitor C13 are connected in parallel.

The output terminal of the resistor R14 is connected to the output terminal of the distortion correcting signal generating unit 220 and connected to a positive terminal(+) of the amplifying device OP of the amplifier 235.

In the meantime, an input side of the externally-supplied voltage source Vcc is connected to resistors R31 and R32 for dividing the externally-supplied voltage source Vcc and for generating a reference voltage.

The output terminal of the resistor R31 is connected to a negative terminal of the amplifying device OP, and the output terminal of the resistor R32 is grounded.

A capacitor C51 and a resistor R51 is connected between the output terminal of the amplifying device OP and the negative terminal thereof in series, and a capacitor C52 is connected between the output terminal of the amplifying device OP and the negative terminal thereof.

The input side of the externally-supplied voltage source Vcc is connected to resistors R71 and R72 for dividing the externally-supplied voltage source Vcc and for generating a comparative voltage. The output terminal of the resistor R71 is connected to a capacitor C71 for charging the comparative voltage and to an anode side of a diode D71 for switching on and off and for bypassing the charged comparative voltage by the capacitor C71 when an output voltage of the capacitor C71 is higher than the voltage of the output signal of the amplifying device OP. Further, the cathode side of the diode D71 is connected to the rectifier 239, and the respective one terminals of the resistor R72 and the capacitor C71 are grounded.

The output terminal of the amplifying device OP is connected to a resistor R91, and the output terminal of the resistor R71 is connected to a capacitor C91. The input terminal of the capacitor C91 is connected to the cathode of the diode D71 and to the input terminal of the PWM signal generating unit 240, and the one terminal of the capacitor C91 is grounded.

In connection with this embodiment of the present invention constructed as above, operations and effect of the horizontal deflection circuit for a monitor will be described with reference to the accompanying drawings.

The horizontal sync signal Hs is supplied to the horizontal oscillator 110, the oscillator 100 receives the horizontal sync signal Hs and outputs the oscillating signal, and the oscillating signal is supplied to the horizontal driving section 120.

Figure 1:
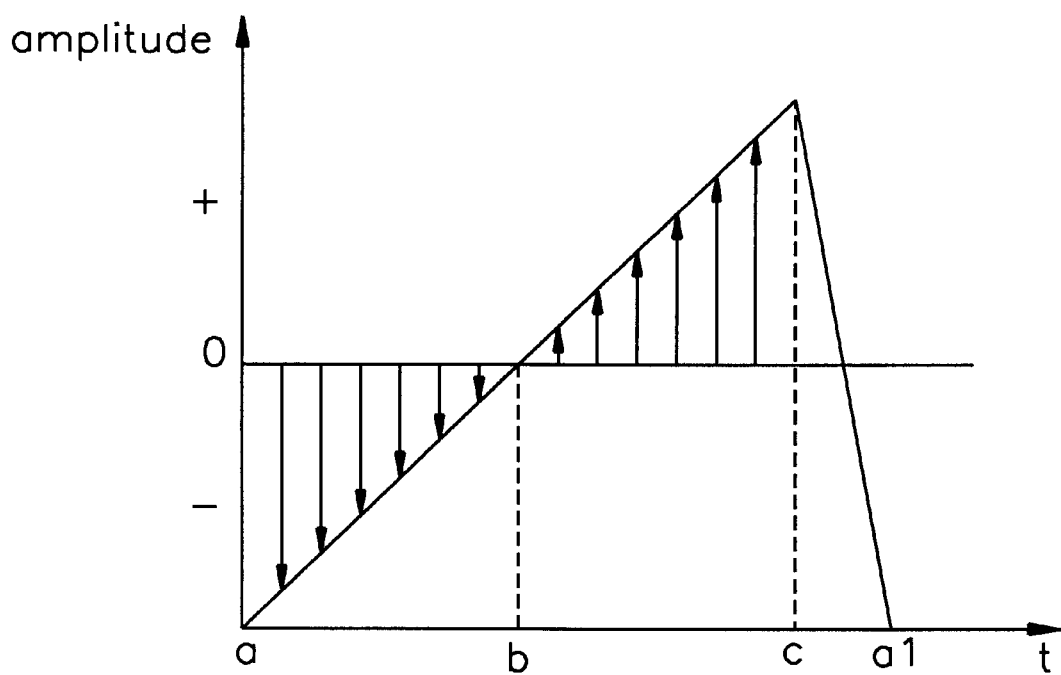
FIG. 1 is a view for showing a horizontal deflection signal of sawtooth waveform supplied to a horizontal deflection coil in a conventional monitor.
Figure 2:
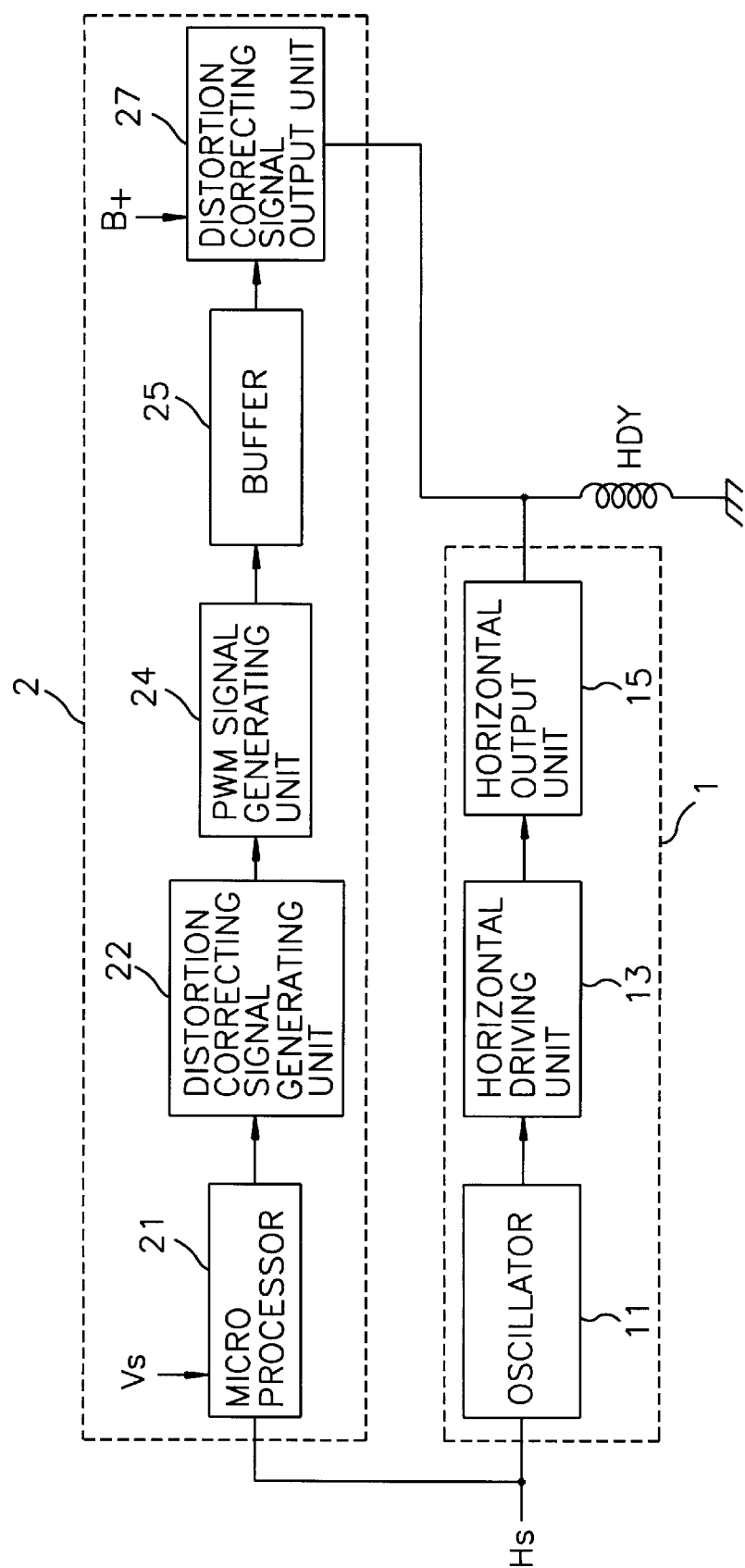
FIG. 2 is a view for showing a construction of the conventional horizontal deflection circuit for a monitor.

The horizontal driving section 120 amplifies the oscillating signal and generates the driving signal. The driving signal is supplied to the horizontal output unit 130. The horizontal output unit 130 switches on and off and generates the horizontal deflection signal of sawtooth waveform which flows in the horizontal deflection coil HDY in accordance with the amplifying signal supplied from the distortion correcting signal output unit 260 and the switching state, as shown in FIG. 1.

In the meantime, the horizontal sync signal Hs and the vertical sync signal Vs are supplied to the microprocessor 210 of the distortion correcting section 200, and the microprocessor 210 determines the mode of monitor in accordance with the horizontal sync signal Hs and the vertical sync signal Vs, and generates the control signal in order that the horizontal picture size signal and the distortion correcting signal of parabolic waveform are generated.

The control signal is supplied to the distortion correcting signal generating unit 220.

Figure 3:
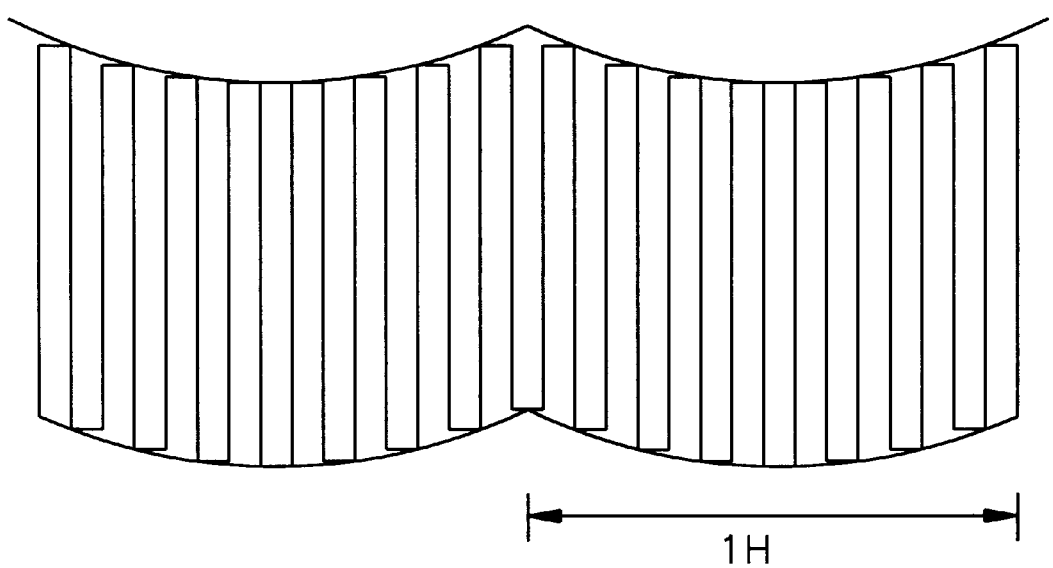
FIG. 3 is a view for showing a PWM signal in a conventional monitor.

The distortion correcting signal generating unit 220 superimposes the horizontal picture size signal and the distortion correcting signal, and the superimposed signal is supplied to the PWM signal generating unit 240 through the distortion correcting signal control unit 230. The PWM signal generating unit 240 modulates the superimposed signal and outputs the PWM signal, as shown in FIG. 3.

The PWM signal is supplied to the buffer 250 which buffers the PWM signal. The output signal of the buffer 250 is supplied to the distortion correcting signal output unit 260.

The distortion correcting signal output unit 260 amplifies the output signal of the buffer 250 in accordance with the externally-supplied voltage source B+, and supplies the amplifying signal to the horizontal deflection coil HDY.

The amplifying signal supplied to the horizontal deflection coil HDY is supplied to the distortion correcting signal control unit 230. The distortion correcting signal control unit 230 controls the amplitude of the distortion correcting signal which is supplied from the distortion correcting signal generating unit 220.

The operation of the distortion correcting signal control unit 230 will be described in more detail with reference to the attached FIG. 5.

The amplifying signal of the distortion correcting signal output unit 260 is supplied to the resistor R11 and the capacitor C11 of the distortion correcting signal detector 231, and the resistor R11 and the capacitor C11 detect the amplifying signal rapidly.

And the detected amplifying signal is supplied to the resistors R12 and R13. The resistors R12 and R13 divides the detected amplifying signal and generate a dividing signal.

The dividing signal is supplied to the capacitor C12, and the capacitor C12 rectifies the dividing signal. The output signal of the capacitor C12 is supplied to the resistor R14 and the capacitor C13.

The resistor R14 and the capacitor C13 detect the rectifying signal of the capacitor C12 rapidly, and the output signal of the resistor R14 and the capacitor C13 are superimposed to the distortion correcting signal of the distortion correcting signal generating unit 220, and the superimposed signal is supplied to the positive terminal of the amplifying device OP of the amplifier 235.

In the meantime, the externally-supplied voltage source Vcc is supplied to the resistors R31 and R32 of the reference voltage generator 233, and the resistors R31 and P32 divide the externally-supplied voltage source Vcc and output the reference voltage.

The reference voltage is supplied to the negative terminal of the amplifying device OP, and amplifying device OP amplifies the superimposed signal in accordance with the reference voltage. The amplifying ratio of the amplifying device OP determines the resistance R51 and the capacitances of the capacitors C51 and C52.

The output signal of the amplifier 235 is supplied to the capacitor C91 through the resistor R91 of the rectifier 239, and the capacitor C91 rectifies the output signal of the amplifying device OP. The rectifying signal is supplied to the PWM signal generating unit 240.

In the meantime, the externally-supplied voltage source Vcc is supplied to the resistors R71 and R72 of the comparative voltage generator 237, and the resistors R71 and R72 divide the externally-supplied voltage source Vcc and output the comparative voltage. Further, the comparative voltage is supplied to the capacitor C71, so capacitor C71 is charged with the comparative voltage.

When the charged comparative voltage is higher than the voltage of the output signal of the resistor R91, the diode D71 switches on, so charged comparative voltage is supplied to the resistor R91, and the charged comparative voltage is superimposed to the output signal of the amplifier 235. The superimposed signal is supplied the capacitor C91, and the capacitor C91 rectifies the superimposed signal.

That is, when the output voltage of the amplifier 235 is lower than the comparative voltage, the comparative voltage is supplied to the PWM signal generating unit 240 through the capacitor C91.

Further, the output signal of the capacitor C91 is supplied to the PWM signal generating unit 240, and the PWM signal generating unit 240 generates the PWM signal, as shown in FIG. 3. Here, the switching cycle of PWM signal is determined in accordance with the output signal of the capacitor C91.

Accordingly, if the amplitude of the distortion correcting signal is decreased, the amplitude of superimposed signal supplied to the positive terminal of the amplifying device OP is decreased. Therefore, the switching cycle of the PWM signal increases according to the decreased superimposed signal, so that the amplitude of amplifying signal of the distortion correcting signal output unit 260 increases.

However, when the amplitude of superimposed signal is lower than the comparative signal, the comparative signal is supplied to the PWM signal generating unit 240. Therefore, the switching cycle of PWM signal is decreased, so that the switching device of the distortion correcting signal output unit 260 can be protected from damage.

By employing the horizontal deflection circuit for the monitor according to the embodiment of the present invention, the switching cycle of the PWM signal is determined in accordance with the amplitude of the amplifying signal. Therefore, the amplitude of the distortion correcting signal become stable. Further, the switching device of the distortion correcting signal output unit due to the switching cycle of the PWM signal can be protected from damage.

While an embodiment of the present invention has been particularly shown and described, it will be understood by those skilled in the art that various changes in form and details may be affected therein without departing from the spirit and scope of the invention as defined by the appended claims. For instance, while the preferred embodiments of the present invention herein are described for a monitor, the present invention may be applied to every video signal processing system such as general VCRs.

What is claimed is:

1. A horizontal deflection circuit for a monitor having a deflection circuit for receiving an externally-supplied horizontal sync signal, for generating a horizontal deflection signal of sawtooth waveform, and for supplying said horizontal deflection signal to a horizontal deflection coil, comprising:

a microprocessor for determining a mode of the monitor according to frequencies of said horizontal sync signal Hs and a vertical sync signal Vs and for generating a control signal in order that a horizontal picture size signal and a distortion correcting signal of parabolic waveform corresponding to said determined mode are generated;

a distortion correcting signal generating means for superimposing said distortion correcting signal and said horizontal picture size signal and for outputting a superimposed signal;

a distortion correcting signal control means for controlling an amplitude of said superimposed signal in accordance with an amplifying signal;

a PWM signal generating means for pulse-width modulating an output signal of the distortion correcting signal control means and for outputting a PWM signal;

a buffer for buffering said PWM signal; and a distortion correcting signal output means for amplifying said PWM signal in accordance with an externally-supplied voltage source B+ and for supplying said amplifying signal to the horizontal deflection coil;

wherein said distortion correcting signal control means includes:

a distortion correcting signal detector for detecting said amplifying signal of said distortion correcting signal output means and for outputting a detecting signal;

a reference voltage generator for setting a reference voltage in accordance with an externally-supplied voltage source;

an amplifier for amplifying said detecting signal according to said reference voltage;

a comparative voltage generator for generating a comparative voltage and a voltage of an output signal of the amplifier when the generated comparative voltage is higher than the voltage of the amplifier; and a rectifier for rectifying said output signal of the amplifier and for supplying said output signal to said PWM signal generating means.

2. A horizontal deflection circuit for a monitor as claimed in claim 1, wherein said distortion correcting signal detector comprises:

a first resistor and a first capacitor connected to said output terminal of said distortion correcting signal output means in parallel for detecting the amplifying signal rapidly;

a second and a third resistors for dividing said output signal of said first resistor and first capacitor;

a second capacitor connected to a connecting point of said second resistor and a third resistor for rectifying said dividing signal of said second resistor and said third resistor and for outputting a rectifying signal; and a fourth resistor and a third capacitor for detecting said rectifying signal rapidly.

3. A horizontal deflection circuit for a monitor as claimed in claim 1, wherein said comparative voltage generator includes:

a first resistor and a second resistor for dividing said externally-supplied voltage source and for outputting said comparative voltage;

a first capacitor connected to said output terminal of said first resistor for charging said comparative voltage; and a diode connected to said output terminal of said first resistor for switching on and off and for passing said comparative voltage when an output voltage of said first capacitor is higher than said output voltage of said amplifying device.

\* \* \* \* \*